(12) United States Patent
Pfister et al.

(10) Patent No.: US 9,863,640 B2
(45) Date of Patent: Jan. 9, 2018

(54) BOTTOM ASSEMBLY UNIT FOR A COMBUSTION CHAMBER ASSEMBLY UNIT OF A VAPORIZING BURNER

(71) Applicant: Eberspächer Climate Control Systems GmbH & Co. KG, Esslingen (DE)

(72) Inventors: Wolfgang Pfister, Esslingen (DE); Walter Blaschke, Deizisau (DE); Valerij Hermann, Stuttgart (DE)

(73) Assignee: Eberspächer Climate Control Systems GmbH & Co. KG, Esslingen (DE)

( * ) Notice: Subject to any disclaimer, the term of this patent is extended or adjusted under 35 U.S.C. 154(b) by 533 days.

(21) Appl. No.: 14/511,499

(22) Filed: Oct. 10, 2014

(65) Prior Publication Data

US 2015/0102116 A1 Apr. 16, 2015

(30) Foreign Application Priority Data

Oct. 14, 2013 (DE) .......................... 10 2013 220 655

(51) Int. Cl.
*F24C 5/02* (2006.01)
*F23D 3/40* (2006.01)
(Continued)

(52) U.S. Cl.
CPC ............. *F24C 5/04* (2013.01); *B60H 1/2203* (2013.01); *F23D 3/40* (2013.01); *F23D 11/448* (2013.01); *F23D 11/46* (2013.01); *F24H 9/1881* (2013.01)

(58) Field of Classification Search
CPC . F24C 5/04; F24C 5/02; B60H 1/2203; B60H 1/2212; F23D 3/40; F23D 11/448; F23D 11/46; F24H 9/1881; F23K 5/22
(Continued)

(56) References Cited

U.S. PATENT DOCUMENTS 3,849,055 A * 11/1974 Stanley ..................... F23D 5/00
431/170
4,230,443 A * 10/1980 Berg ....................... F02M 27/02
431/115
(Continued)

FOREIGN PATENT DOCUMENTS

CN 101142016 A 3/2008
CN 101589271 11/2009
(Continued)

*Primary Examiner* — Gregory Huson
*Assistant Examiner* — Daniel E Namay
(74) *Attorney, Agent, or Firm* — McGlew and Tuttle, P.C.

(57) ABSTRACT

A bottom assembly unit for a vaporizing burner combustion chamber assembly unit, especially for a vehicle heater, includes a bottom part (24) with a bottom wall. A porous evaporator medium (44) at least partially covers the bottom wall on a front side (42) positioned such that it faces a combustion chamber (20). A ring-shaped holding part (34) has a contact area (40) touching the porous evaporator medium (44). The contact area has a holding section (62) extending radially inwardly from a holding part circumferential wall (36) and extends over the porous evaporator medium (44) in a radially outer area (66). A plurality of contact projections (68) are arranged at spaced locations from one another about the longitudinal axis and extend in the direction of the porous evaporator medium. The porous evaporator medium (44) is pressed by the contact projections (68) in a radially outer area (66) against the bottom wall.

20 Claims, 3 Drawing Sheets

(51) Int. Cl.
*F23D 11/44* (2006.01)
*F24C 5/04* (2006.01)
*B60H 1/22* (2006.01)
*F23D 11/46* (2006.01)
*F24H 9/18* (2006.01)
*F23K 5/22* (2006.01)
*F23D 5/10* (2006.01)

(58) Field of Classification Search
USPC .................... 431/7, 170, 326; 126/12.3 C
See application file for complete search history.

(56) References Cited

U.S. PATENT DOCUMENTS

| | | | | |
|---|---|---|---|---|
| 4,365,952 A * | 12/1982 | Ohmukai | ................ | F23D 3/40 239/138 |
| 4,421,476 A * | 12/1983 | Gulden | ................ | F02M 27/02 239/132.3 |
| 5,000,004 A * | 3/1991 | Yamanaka | ............. | F23C 13/00 431/7 |
| 5,020,991 A * | 6/1991 | Schaale | .................... | F23D 3/40 126/110 B |
| 5,056,501 A * | 10/1991 | Ida | ..................... | B60H 1/2212 126/110 B |
| 5,062,788 A * | 11/1991 | Best | ...................... | F23D 14/34 431/10 |
| 5,197,871 A * | 3/1993 | Yamamoto | .............. | F23D 3/40 126/110 B |
| 5,439,372 A * | 8/1995 | Duret | ...................... | F23D 14/02 431/2 |
| 5,441,402 A * | 8/1995 | Reuther | ................ | F23D 14/02 431/328 |
| 5,641,282 A * | 6/1997 | Lee | ......................... | F23D 14/16 126/91 A |
| 5,658,139 A * | 8/1997 | Flanagan | .............. | F23D 14/74 431/328 |
| 5,938,427 A * | 8/1999 | Suzuki | ..................... | F23C 6/04 431/11 |
| 5,993,192 A * | 11/1999 | Schmidt | ................ | F23D 14/18 431/12 |
| 6,431,857 B1 * | 8/2002 | Charmes | ............... | F23D 14/18 431/326 |
| 6,761,558 B1 * | 7/2004 | Kim | ...................... | F23D 14/125 126/91 R |
| 6,991,454 B2 * | 1/2006 | Gore | ....................... | F23D 14/16 126/92 R |
| 7,157,066 B2 * | 1/2007 | Diener | .................. | B82Y 30/00 423/445 B |
| 7,578,669 B2 * | 8/2009 | Liu | ......................... | F23C 13/06 122/367.1 |
| 2001/0035463 A1 * | 11/2001 | Takagi | ..................... | F23D 3/40 237/12 |
| 2002/0132205 A1 * | 9/2002 | Gore | ....................... | F23D 14/16 431/243 |
| 2003/0022118 A1 * | 1/2003 | Suzuki | .................. | F23C 13/02 431/243 |
| 2003/0027090 A1 * | 2/2003 | Blaschke | ............... | B01B 1/005 431/243 |
| 2003/0196381 A1 * | 10/2003 | Eberspach | ............ | B01B 1/005 48/197 FM |
| 2004/0173692 A1 | 9/2004 | Blaschke et al. | | |
| 2005/0136305 A1 * | 6/2005 | Eberspach | ............... | F23D 3/40 429/435 |
| 2008/0124666 A1 * | 5/2008 | Stocker | ................ | F23C 99/006 431/7 |
| 2008/0134580 A1 | 6/2008 | Kah et al. | | |
| 2008/0141675 A1 * | 6/2008 | Liu | ......................... | F23C 13/06 60/777 |
| 2014/0000551 A1 * | 1/2014 | Eberspach | ............. | F02B 19/00 123/253 |
| 2014/0193759 A1 * | 7/2014 | Weber | ..................... | F23C 7/06 431/314 |
| 2014/0234792 A1 * | 8/2014 | Brehmer | ................ | F23D 3/40 431/329 |
| 2014/0346242 A1 * | 11/2014 | Jozinovic | ............... | F23C 7/004 237/32 |

FOREIGN PATENT DOCUMENTS

| | | | | |
|---|---|---|---|---|
| CN | 102200279 | | 9/2011 | |
| DE | 39 14 611 A1 | | 12/1989 | |
| DE | 3914611 A1 * | | 12/1989 | ............ F23D 3/40 |
| DE | 4401799 C1 * | | 6/1995 | ............ F23D 3/40 |
| DE | 102005004359 | * | 8/2006 | ............ F23D 3/40 |
| DE | 10 2005 032 980 A1 | | 1/2007 | |
| DE | EP 1744100 A2 * | | 1/2007 | ............ F23D 3/40 |
| DE | EP 1970624 A2 * | | 9/2008 | ............ F23D 3/40 |
| JP | 02033522 A * | | 2/1990 | ............ F23D 3/40 |

* cited by examiner

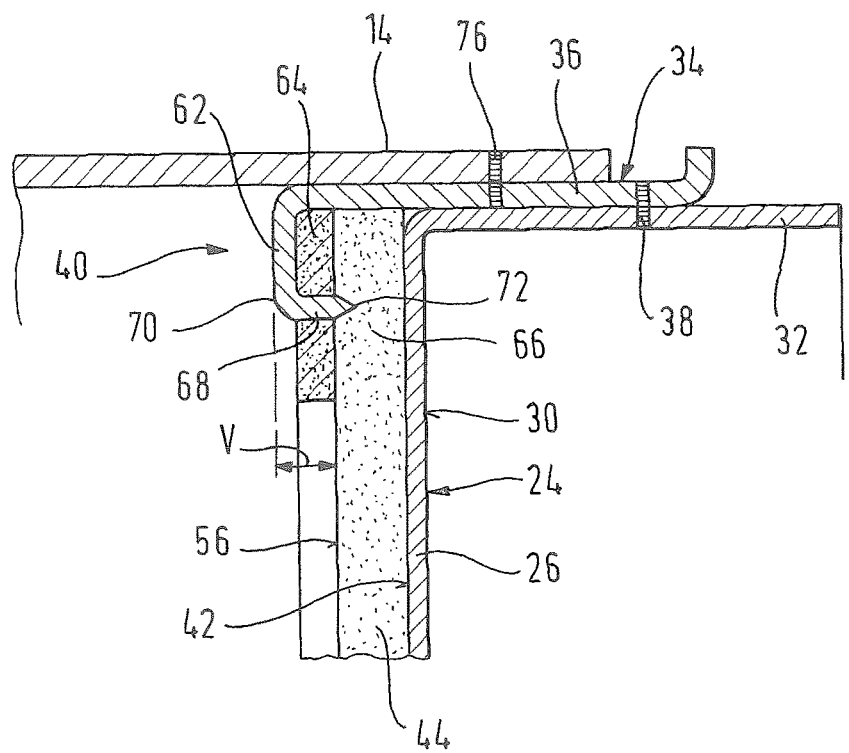
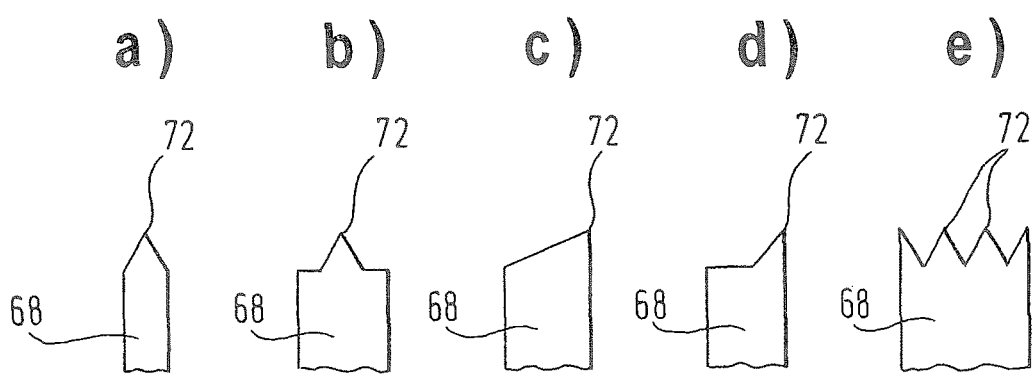

Fig. 4
a)
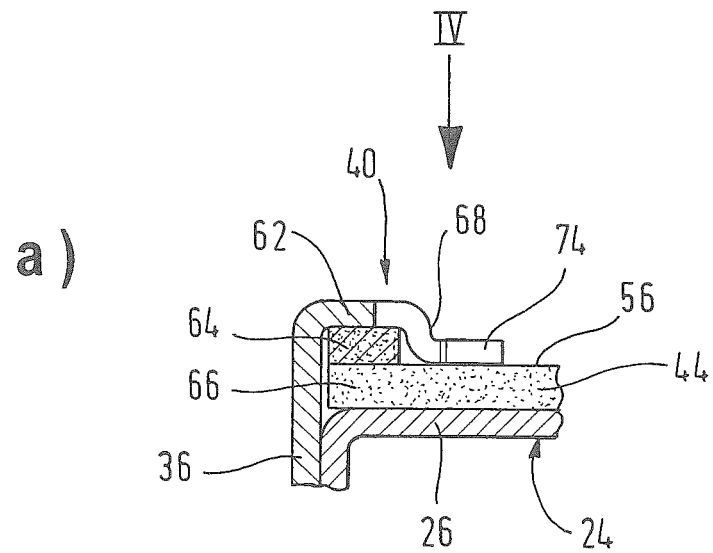
b)
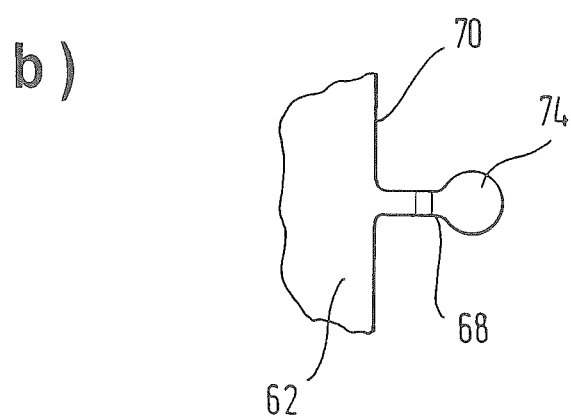

BOTTOM ASSEMBLY UNIT FOR A COMBUSTION CHAMBER ASSEMBLY UNIT OF A VAPORIZING BURNER

CROSS REFERENCE TO RELATED APPLICATIONS

This application claims the benefit of priority under 35 U.S.C. §119 of German Patent Application DE 10 2013 220 655.0 filed Oct. 14, 2013, the entire contents of which are incorporated herein by reference.

FIELD OF THE INVENTION

The present invention pertains to a bottom assembly unit of a bottom chamber assembly unit of a vaporizing burner, especially for a vehicle heater, comprising: a bottom part with a bottom wall; and a porous evaporator medium covering the first bottom wall in at least some areas on a front side of the first bottom wall, which said front side is to be positioned such that it faces a combustion chamber.

BACKGROUND OF THE INVENTION

A combustion chamber assembly unit for a vaporizing burner, in which a pot-like or shell-like bottom part is designed with a bottom wall and with a circumferential wall extending in the direction of a combustion chamber from the bottom wall, is known from DE 10 2005 032 980 A1. A disk-like porous evaporator medium is provided in this shell-like structure of the bottom part. A housing part surrounding the bottom part radially on the outside has, to axially support the bottom part, a radially inwardly extending, flange-like contact area, which extends over the circumferential wall of the bottom part, on the one hand, and over the radially outer area of the porous evaporator medium, on the other hand. An intermediate contact element having a ring-shaped design and made of porous material is located between this flange-like contact area and the radially outer area of the porous evaporator medium. This intermediate contact element, also called wick ring, ensures that fuel is prevented from being discharged in the liquid form or in the form of droplets in the radially outer area of the porous evaporator medium during a start phase, when the rate of evaporation of the fuel from the porous evaporator medium is comparatively low because of comparatively low temperatures of the components.

The bottom part held together with the housing part surrounding this in the axial direction is ensured by a circlip, which is locked onto the housing part and presses the bottom part against the flange-like contact area via the intermediary of the intermediate contact element or wick ring. Since further assembly units, especially an electrically energizable heating arrangement, are also located between this circlip and the bottom part, there is basically a risk that the bottom part is pressed too strongly against the intermediate contact element because of the existing manufacturing tolerances and this intermediate contact element is pressed correspondingly strongly against the flange-like contact area, so that the pore structure of the intermediate contact element is compressed so greatly that it cannot sufficiently assume its function any longer. Since the contact pressure between the intermediate contact element and the flange-like contact area may, in principle, only be limited, the porous evaporator medium also cannot, furthermore, be pressed sufficiently strongly against the bottom part in the radially outer area of the porous evaporator medium. In order to achieve a pressing contact guaranteeing a defined and good heat transfer between the porous evaporator medium and the bottom part, it is therefore necessary to bind the porous evaporator medium more strongly to the bottom part at a plurality of points by connection in substance, i.e., for example, by welding, which leads to additional expenditure of labor.

SUMMARY OF THE INVENTION

An object of the present invention is to provide a bottom assembly unit for a combustion chamber assembly unit of a vaporizing burner, with which a stable and defined contact is achieved between the porous evaporator medium and a bottom part carrying same with an embodiment having a simple design.

This object is accomplished according to the present invention by a bottom assembly unit of a vaporizing burner, especially for a vehicle heater, comprising:
  a bottom part with a bottom wall,
  a porous evaporator medium covering the bottom wall in at least some areas on a front side of the bottom wall, which said front side is to be positioned such that it faces a combustion chamber,
  a ring-shaped holding part with a circumferential wall and with a contact area touching the porous evaporator medium, wherein the contact area comprises a contact section extending from the circumferential wall radially inwardly and extending over the porous evaporator medium in its radially outer area and a plurality of contact projections, which follow each other about the longitudinal axis, are arranged at spaced locations from one another and extend in the direction of the porous evaporator medium, wherein the porous evaporator medium is pressed at least by the contact projections in its radially outer area against the first bottom wall.

It is ensured in the bottom assembly unit designed according to the present invention by the provision of a plurality of contact projections, which act on the porous evaporator medium in its radially outer area and thus press same against the bottom wall of the bottom part, that, on the one hand, there is a holding together, which guarantees stable holding of the porous evaporator medium. On the other hand, very good heat transfer is guaranteed between the bottom part and the porous evaporator medium by the locally comparatively high pressing pressure that the contact projections can exert on the porous evaporator medium.

To further improve the contact between the porous evaporator medium and the bottom part, it is proposed that the porous evaporator medium be pressed against the bottom wall by the contact projections and the contact section in its radially outer area.

In an embodiment that can have a very simple design, provisions may be made for the contact area to be provided, in at least some areas, by a curved end area of the second circumferential wall. To make it possible to guarantee uniform load on the porous evaporator medium distributed over the circumference, provisions may, furthermore, be made for the contact section to have a ring-shaped design and to extend about the longitudinal axis preferably without interruptions.

Provisions may be made in an embodiment that may have a simple design for at least one contact projection to extend, starting from a radially inner end area of the contact section, radially inwardly or/and in the direction of the porous evaporator medium.

To make it possible to further increase the local load on the porous evaporator medium, it is proposed that at least one contact projection have at least one contact tip.

Provisions may, furthermore, be made in the bottom assembly unit designed according to the present invention for an intermediate contact element to be provided, which covers the porous evaporator medium in its radially outer area and is held between the contact section and the porous evaporator medium. This intermediate contact element is preferably designed in a ring-shaped manner without interruptions to achieve a uniform interaction with the porous evaporator medium and may, furthermore, be made of a porous material. This makes it possible, especially during a start phase, to prevent the discharge of liquid, droplet-shaped fuel in the direction of the combustion chamber, because the intermediate contact element can act as a liquid buffer. An excessively strong load of the contact section on the intermediate contact element can be done away with, especially because of the circumstance that a comparatively heavy local load is guaranteed by the provision of the contact projections in the design according to the present invention, so that the risk of damage to the pore structure is eliminated.

At least one contact projection preferably penetrates into the porous evaporator medium, which may lead to a comparatively high local load thereon. Provisions may be made for this, for example, for at least one contact projection penetrating the porous evaporator medium to pass through the intermediate contact element or/and for at least one contact projection penetrating the porous evaporator medium to become pressed into the porous evaporator medium. Especially advantageous here is the variant in which a contact projection penetrates the intermediate contact element. A comparatively strong pressing may be present in this case between the contact projection and the porous evaporator medium, while the intermediate contact element must be compressed comparatively slightly in the direction of the load.

A stable design, which also leads to the achievement of a liquid-tight sealing, may make provisions for the bottom part to comprise a circumferential wall extending from an outer edge area of the bottom wall essentially in the direction of a longitudinal axis of the bottom assembly unit, wherein this circumferential wall extends, starting from the bottom wall, in the direction away from the porous evaporator medium, on a rear side of the bottom wall, which said rear side is to be positioned such that it faces away from a combustion chamber, and for the circumferential wall of the holding part to extend at least partially axially over the circumferential wall of the bottom part on its outer side.

The bottom assembly unit according to the present invention can be manufactured with a comparatively high manufacturing precision in a simple and cost-effective manner by the bottom part or/and the holding part being designed as a shaped sheet metal part, preferably from steel plate or/and in a deep-drawing operation.

The present invention pertains, further, to a combustion chamber assembly unit for a vaporizing burner, especially for a motor vehicle, comprising a bottom assembly unit designed according to the present invention as well as a combustion chamber circumferential wall, which extends at least partially over the circumferential wall of the holding part on its outer side and is fixed to same.

The present invention will be described in detail below with reference to the drawings attached. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 2 is an enlarged detail view of the combustion chamber assembly unit according to FIG. 1;

FIG. 3 is different types of embodiments of a contact projection penetrating a porous evaporator medium in its views a), b), c), d), e); and FIG. 4 is a variant of a contact area shown in the lower part of FIG. 1 in its view a) and a detail view of the contact area shown in FIG. 4a) in direction of view IV in its view b).

DESCRIPTION OF THE PREFERRED EMBODIMENTS

Figure 1:
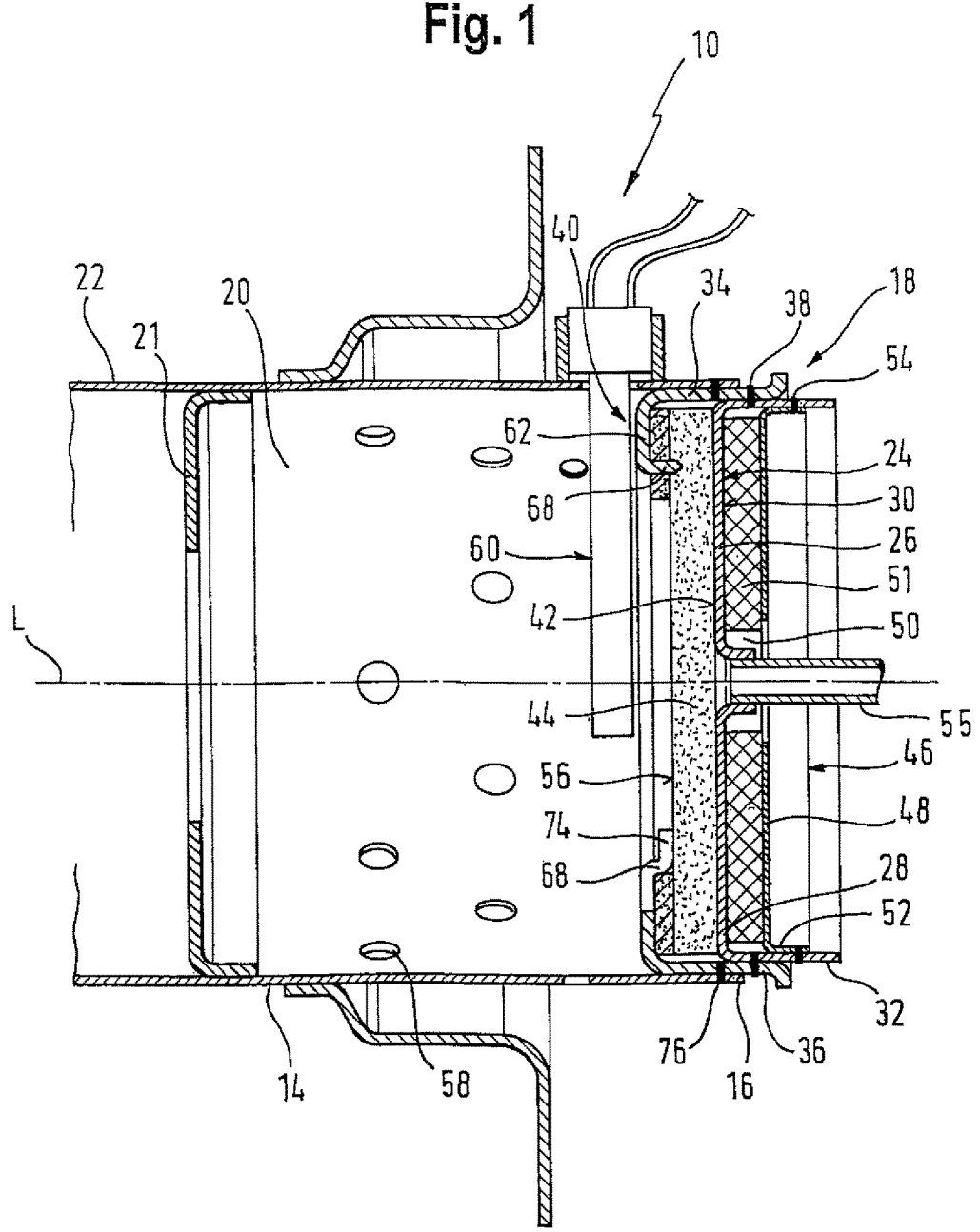
FIG. 1 is a partial longitudinal sectional view of a combustion chamber assembly unit for a vaporizing burner of a vehicle heater.

Referring to the drawings in particular, a combustion chamber assembly unit for a vaporizing burner of a vehicle heater is generally designated by 10 in FIG. 1. The combustion chamber assembly unit 10 comprises a combustion chamber circumferential wall 14, which defines a combustion chamber 20 together with a bottom assembly unit 18 fixed to an axial end area 16, axially relative to a longitudinal axis L of the combustion chamber assembly unit. The combustion chamber circumferential wall 14 passes integrally over into a flame tube 22 in the area of a flame diaphragm 21.

The bottom assembly unit 18 comprises a bottom part 24 of a generally shell-like or pot-like design with a first bottom wall 26 and with a first circumferential wall 32, which adjoins same in a radially outer edge area 28 and extends on a rear side 30 of the first bottom wall 26 away from the combustion chamber 20.

A first holding part 34 having a generally ring-shaped design surrounds with a second circumferential wall 36 thereof the first circumferential wall 32 of the bottom part 24 and is rigidly connected with same, for example, by press fit or/and by welding, i.e., for example, by a weld seam 38 formed by laser welding. In a contact area 40, which will be explained in more detail below, the first holding part 34 acts on a porous evaporator medium 44, which has, for example, a disk-like configuration and is arranged on a front side 42, i.e., the side of the first bottom wall 26 facing the combustion chamber 20, and holds this in contact with the first bottom wall 26.

A second holding part 46 having a generally pot-like or shell-like design is arranged on the rear side 30 of the first bottom wall 26 such that a second bottom wall 48 thereof is located axially opposite the first bottom wall 26 and defines together with this a mounting space 50. For example, heat-insulating material 51, but, as an alternative or in addition, also an electrically energizable heating arrangement may also be arranged in this mounting space in order to heat the first bottom wall 26 and, via the latter, the porous evaporator medium 44, especially during a start phase of the combustion operation to increase the rate of fuel evaporation.

The second holding part 46 comprises, further, a third circumferential wall 52 extending from the second bottom wall 48 in the direction away from the first bottom wall 26. The first circumferential wall 32 of the bottom part 24 surrounds this third circumferential wall 52 and is rigidly connected with same by press fit or/and by welding, i.e., for example, by forming a weld seam 54 by laser welding.

A fuel feed line 55 passes through the second bottom wall 48 preferably in a central area and the mounting space 50 and opens into the first bottom wall 24 in a central area in order to feed liquid fuel into the porous evaporator medium 44. Based on its porous structure, the porous evaporator medium 44 distributes the liquid fuel in its inner volume area, so that this can also move in the direction of a side 56 of the porous evaporator medium, which said side faces the combustion chamber 20, by capillary delivery action, and can evaporate there in the direction of the combustion chamber 20. The air necessary for the combustion can be fed via a plurality of combustion air inlet openings 58 provided in the combustion chamber circumferential wall 14. The mixture thus formed from evaporated fuel and combustion air can be ignited by an electrically energizable ignition element 60, for example, a glow plug, which protrudes through the combustion chamber circumferential wall 14 into the combustion chamber 20 and is located opposite and at a comparatively closely spaced location preferably in parallel to the side 56 of the porous evaporator medium 44.

FIG. 2 shows an enlarged view of the design and the interaction of the contact area 40 of the first holding part 34 with the porous evaporator medium 44.

The contact area 40 comprises a holding section 62 extending radially inwardly starting from the second circumferential wall 36 of the first holding part 34. The holding section 62 has a ring-shaped design extending about the longitudinal axis L preferably without interruptions and may be shaped such or extend such that it extends essentially in parallel to the essentially planar side 56 of the porous evaporator medium 44. An intermediate contact element 64, which preferably also consists of porous material, is positioned between this ring-shaped holding section 62 and the porous evaporator medium 44. This covers the porous evaporator medium 44 in its radially outer area 66 and is located, at least with its radially outer section, between the holding section 62 of the contact area 40 and the porous evaporator medium 44.

The contact area 40 comprises, further, a plurality of contact projections 68, which are positioned at spaced locations from one another about the longitudinal axis L and extend, starting from the holding section 62, towards the porous evaporator medium 44. These preferably extend essentially in the direction of the longitudinal axis L starting from a radially inner end area 70 of the contact section. This offers the possibility of providing the first holding part 34 together with the entire contact area 40, i.e., with the section 62 and with the contact projections 68, as an integral component. This may be generated, for example, by punching out and deep-drawing a sheet metal blank, wherein the contact area 40 is formed essentially by a curved end area of the second circumferential wall 36 and of the first holding part 34.

The contact projections 68 provided in a plurality of circumferential positions pass through the intermediate contact element 64 and protrude with a respective tip 72 into the porous evaporator medium 44. As a result, the porous evaporator medium 44 is compressed more strongly in this area and is pressed correspondingly more strongly against the first bottom wall 26 of the bottom part 24. This in turn generates locally, i.e., in the area of a respective contact projection 68, an improved heat transfer contact between the first bottom wall 26 and the porous evaporator medium 44.

When assembling the bottom assembly unit 18, it is possible to proceed such that after positioning the porous evaporator medium 44 in contact with the first bottom wall 26, the intermediate contact element 64 is placed over the radially outer area 66 of the porous evaporator medium 44. The first holding part 34 is then pushed axially over the bottom part 24, so that the second circumferential wall 36 extends over the first circumferential wall 32 over its outer side. The first holding part 34 can be displaced now in relation to the bottom part 24 to the extent that a predetermined distance V is obtained between the axial outer side of the holding section 62 and the side 56 of the porous evaporator medium 44 facing the combustion chamber 20. The contact projections 68 pass through the intermediate contact element 64 in the course of this relative motion between the first holding part 34 and the bottom part 24 and penetrate the porous evaporator medium 44. When this state is reached, it is guaranteed that the intermediate contact element 64 is pressed sufficiently firmly against the side 56 of the porous evaporator medium 44 and escape of liquid fuel in an interface area between the intermediate contact element 64 and the porous evaporator medium 44 as well as in an interface area between the holding section 62 and the intermediate contact element 64 is not possible, but, on the other hand, the intermediate contact element 64 is not compressed so strongly that its pore structure cannot be used to take up liquid fuel any longer.

Of course, despite the increased pressing of the porous evaporator medium 44 against the first bottom wall 24, which is guaranteed by the use of the contact projections 68, the porous evaporator medium 44 can be additionally bound locally to the first bottom wall 24, for example, by generating welding spots, in order to further improve the thermal contact of the porous evaporator medium 44, in order to make it possible to introduce heat provided, for example, by an electrically energizable heating arrangement provided on the rear side 30 of the first bottom wall 26 into the porous evaporator medium 44 even better.

The views a) through e) in FIG. 3 show different embodiments of a contact projection 68. FIG. 3a) shows an embodiment shown, for example, in FIG. 2 with a contact projection 68, which is provided with a tip 72 in its area that is to be positioned such that it protrudes into the porous evaporator medium 44. In the example according to FIG. 3b), the contact projection 68 has a slightly greater width and passes gradually over into the tip 72. In the embodiment according to FIG. 3c), the axial end of the contact projection 68 has a trapezoidal shape, so that a tip 72 is formed on a lateral end area. A similar embodiment is shown in FIG. 3d) with a somewhat smaller width of the tip. The embodiment according to FIG. 3e) shows a contact projection 68 with a plurality of tips 72.

Depending on the embodiment of the axial end of the contact projection 68, this can actually pass through the intermediate contact element 64 in the above-described manner and also penetrate directly into the porous evaporator medium 44. It may also be possible, in principle, to make provisions for such a contact projection not to pass through the intermediate contact element 64 or not to pass through it completely and for this element to be pressed into the area of the porous evaporator medium 44 and to penetrate in this manner into the porous evaporator medium 44 without touching it directly.

A modified embodiment of the contact area 40 or of a contact projection 68 is represented in the lower half of FIG.

1 and in FIGS. 4a) and 4b). The porous evaporator medium 44 positioned on the bottom wall 26 and the contact area 40 with its holding section 62, which extends over the radially outer area 66 of the porous evaporator medium 44 and preferably has a ring-shaped circular design, are recognized. This holding section 62 also extends partially over the intermediate contact element 64 in the radial direction. Contact projections bent at first radially inwardly and then axially towards the porous evaporator medium 44 starting from the holding section 62 extend in some circumferential positions. These projections have no tips penetrating into the porous evaporator medium 44 or passing through the intermediate contact element 64 here, but are provided with a, for example, circular disk-shaped contact end 74, which is pressed against the side 56 of the porous evaporator medium 44 and thus brings about a more intimate contact in this area between the porous evaporator medium 44 and the first bottom wall 26. The pressure is applied to the intermediate contact element 64 in a defined manner by the holding section 62 extending at least partially over this radially.

It should be noted that many different embodiments of the contact projections 68 may, of course, be selected, even adapted to the required pressing pressure, as well as to the number of the contact projections 68 arranged distributed about the longitudinal axis L. The design according to the present invention guarantees in any case that when the bottom assembly unit 18 is assembled, a defined pressing pressure can be reached for the porous evaporator medium 44 and a defined pressing pressure can also be reached for the intermediate contact element 64. The bottom assembly unit 18 designed in this manner can then be inserted into the axial end area 16 of the combustion chamber circumferential wall 14 and connected with it by press fit or/and by connection in substance, preferably by a weld seam 76 generated by means of laser welding. The second holding part 46 can be inserted into the bottom assembly unit 18 already before the latter is fixed at the combustion chamber circumferential wall 14, especially also before placing the first holding part 34 on the bottom part 24.

While specific embodiments of the invention have been shown and described in detail to illustrate the application of the principles of the invention, it will be understood that the invention may be embodied otherwise without departing from such principles.

What is claimed is:

1. A bottom assembly unit for a vaporizing burner combustion chamber assembly unit for a vehicle heater, the bottom assembly comprising:
    a bottom part comprising a bottom wall;
    a porous evaporator medium at least partially covering the bottom wall on a bottom wall front side that is to be positioned facing a combustion chamber;
    a fuel feed line opening into the bottom wall for feeding liquid fuel into the porous evaporator medium; and
    a ring-shaped holding part comprising a circumferential wall and a contact area touching the porous evaporator medium, wherein the contact area comprises a contact section extending radially inwardly from the circumferential wall and extending over the porous evaporator medium in a radially outer area, and a plurality of contact projections arranged at spaced locations following one another about a longitudinal axis and extending in a direction towards the porous evaporator medium, wherein the porous evaporator medium is pressed against the bottom wall at least by the contact projections in the radially outer area.

2. A bottom assembly unit in accordance with claim 1, wherein the porous evaporator medium is pressed by the contact projections and the contact section in the radially outer area against the bottom wall, whereby the porous evaporator medium is in direct contact with the bottom wall.

3. A bottom assembly unit in accordance with claim 1, wherein the contact area is at least one of formed in at least some areas by a curved end area of the circumferential wall of the holding part and has a ring-shaped design and extends about the longitudinal axis.

4. A bottom assembly unit in accordance with claim 1, wherein at least one of the contact projections extends, starting from a radially inner end area of the contact section at least one of radially inwardly and in the direction of the porous evaporator medium.

5. A bottom assembly unit in accordance with claim 1, wherein at least one of the contact projections comprises at least one contact tip.

6. A bottom assembly unit in accordance with claim 1, further comprising an intermediate contact element covering the porous evaporator medium in a radially outer area thereof, the intermediate contact element being held between the contact section and the porous evaporator medium, the bottom part comprising a bottom part circumferential wall connected to the bottom wall, the bottom part circumferential wall being located radially inward of the circumferential wall of the ring-shaped holding part with respect to the longitudinal axis.

7. A bottom assembly unit in accordance with claim 6, wherein the intermediate contact element is ring-shaped, at least an outer portion of the bottom part circumferential wall being in direct contact with an inner portion of the circumferential wall of the ring-shaped holding part.

8. A bottom assembly unit in accordance with claim 6, further comprising:
    a second holding part comprising a second holding part circumferential wall, the second holding part circumferential wall being located radially inward of the bottom part circumferential wall and the circumferential wall of the ring-shaped holding part with respect to the longitudinal axis, wherein the intermediate contact element is made of a porous material.

9. A bottom assembly unit in accordance with claim 6, further comprising:
    a second holding part comprising a second holding part circumferential wall, the second holding part circumferential wall being located radially inward of the bottom part circumferential wall and the circumferential wall of the ring-shaped holding part with respect to the longitudinal axis, at least an outer portion of the bottom part circumferential wall being in direct contact with an inner portion of the circumferential wall of the ring-shaped holding part, at least an outer portion of the second holding part circumferential wall being in direct contact with an inner portion of the bottom part circumferential wall, wherein at least one of the contact projections passes through the intermediate contact element or presses the intermediate contact element into the porous evaporator medium.

10. A bottom assembly unit in accordance with claim 1, wherein at least one of the contact projections penetrates into the porous evaporator medium.

11. A bottom assembly unit in accordance with claim 1, wherein:
    the bottom part comprises a bottom part circumferential wall, which extends from an outer edge area of the bottom wall essentially in the direction of a longitudinal axis of the bottom assembly unit;

the bottom part circumferential wall extends, starting from the bottom wall, in the direction away from the porous evaporator medium on a rear side of the bottom wall, which said rear side is to be positioned such that the rear side faces away from the combustion chamber; and the circumferential wall of the holding part extends axially at least partially over the bottom part circumferential wall on an outer side thereof and is fixed to same.

12. A bottom assembly unit in accordance with claim 1, wherein at least one of the bottom part and the holding part comprises a shaped sheet metal part, shaped from steel plate or in a deep-drawing operation.

13. A vaporizing burner combustion chamber assembly unit for a vehicle heater, the combustion chamber assembly unit comprising:

a combustion chamber circumferential wall; and a bottom assembly comprising:

a bottom part comprising a bottom wall;

a porous evaporator medium at least partially covering the bottom wall on a bottom wall front side that is to be positioned facing a combustion chamber;

a fuel feed line opening into the bottom wall for feeding liquid fuel into the porous evaporator medium; and a ring-shaped holding part comprising a circumferential wall and a contact area touching the porous evaporator medium, wherein the contact area comprises a contact section extending radially inwardly from the circumferential wall and extending over the porous evaporator medium in a radially outer area, and a plurality of contact projections arranged at spaced locations following one another about a longitudinal axis and extending in a direction towards the porous evaporator medium, wherein the porous evaporator medium is pressed against the bottom wall at least by the contact projections in the radially outer area, wherein the combustion chamber circumferential wall extends at least partially over the circumferential wall of the holding part and is fixed to same.

14. A combustion chamber assembly unit in accordance with claim 13, wherein the contact area is at least one of formed in at least some areas by a curved end area of the circumferential wall of the holding part and has a ring-shaped design and extends about the longitudinal axis.

15. A combustion chamber assembly unit in accordance with claim 13, wherein at least one of the contact projections comprises at least one contact tip.

16. A combustion chamber assembly unit in accordance with claim 13, further comprising an intermediate contact element covering the porous evaporator medium in a radially outer area thereof, the intermediate contact element being held between the contact section and the porous evaporator medium, the bottom part comprising a bottom part circumferential wall connected to the bottom wall, the bottom part circumferential wall being located radially inward of the circumferential wall of the ring-shaped holding part with respect to the longitudinal axis.

17. A combustion chamber assembly unit in accordance with claim 16, wherein the intermediate contact element is ring-shaped, wherein at least an outer portion of the bottom part circumferential wall is in direct contact with an inner portion of the circumferential wall of the ring-shaped holding part.

18. A combustion chamber assembly unit in accordance with claim 16, wherein the combustion chamber assembly unit further comprises a second holding part comprising a second holding part circumferential wall, the second holding part circumferential wall being located radially inward of the bottom part circumferential wall and the circumferential wall of the ring-shaped holding part with respect to the longitudinal axis, wherein the intermediate contact element is made of a porous material.

19. A combustion chamber assembly unit in accordance with claim 16, wherein the combustion chamber assembly unit further comprises a second holding part comprising a second holding part circumferential wall, the second holding part circumferential wall being located radially inward of the bottom part circumferential wall and the circumferential wall of the ring-shaped holding part with respect to the longitudinal axis, at least an outer portion of the bottom part circumferential wall being in direct contact with an inner portion of the circumferential wall of the ring-shaped holding part, at least an outer portion of the second holding part circumferential wall being in direct contact with an inner portion of the bottom part circumferential wall, wherein at least one of the contact projections penetrates into the porous evaporator medium.

20. A combustion chamber assembly unit in accordance with claim 16, wherein at least one of the contact projections passes through the intermediate contact element or presses the intermediate contact element into the porous evaporator medium, the combustion chamber assembly unit further comprising heat insulating material and a second holding part comprising a second holding part circumferential wall, the second holding part circumferential wall being located radially inward of the bottom part circumferential wall and the circumferential wall of the ring-shaped holding part with respect to the longitudinal axis, the heat insulating material being arranged between the bottom part and the second holding part.

* * * * *